(12) United States Patent
Héroux

(10) Patent No.: US 9,086,551 B2
(45) Date of Patent: Jul. 21, 2015

(54) DOUBLE MIRROR STRUCTURE FOR WAVELENGTH DIVISION MULTIPLEXING WITH POLYMER WAVEGUIDES

(71) Applicant: INTERNATIONAL BUSINESS MACHINES CORPORATION, Armonk, NY (US)

(72) Inventor: Jean Benoit Héroux, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 29 days.

(21) Appl. No.: 14/067,535

(22) Filed: Oct. 30, 2013

(65) Prior Publication Data

US 2015/0117811 A1   Apr. 30, 2015

(51) Int. Cl.
*G02B 6/12* (2006.01)
*G02B 6/42* (2006.01)

(52) U.S. Cl.
CPC ............ *G02B 6/4215* (2013.01); *G02B 6/4214* (2013.01)

(58) Field of Classification Search
CPC ............................ G02B 6/4215; G02B 6/4214
USPC ................................................. 385/14, 88–93
See application file for complete search history.

(56) References Cited

U.S. PATENT DOCUMENTS

| | | | |
|---|---|---|---|
| 5,627,923 A * | 5/1997 | Kakizaki | 385/14 |
| 7,672,547 B2 * | 3/2010 | Kim et al. | 385/14 |
| 7,778,502 B2 * | 8/2010 | Hiruta | 385/14 |
| 7,860,397 B2 | 12/2010 | Mori et al. | |
| 7,869,671 B2 * | 1/2011 | Ishida et al. | 385/14 |
| 8,301,002 B2 * | 10/2012 | Shani | 385/129 |
| 8,639,067 B2 * | 1/2014 | Matsuoka | 385/14 |
| 2002/0118907 A1 * | 8/2002 | Sugama et al. | 385/14 |
| 2003/0161573 A1 * | 8/2003 | Ishida et al. | 385/14 |
| 2013/0016973 A1 | 1/2013 | Zheng et al. | |
| 2013/0064507 A1 | 3/2013 | Mahnkopf et al. | |
| 2013/0170803 A1 | 7/2013 | Mori et al. | |

FOREIGN PATENT DOCUMENTS

WO   WO2013109264 A1   7/2013

OTHER PUBLICATIONS

Kim, K., et al. "Flexible Polymeric Tunable Lasers for WDM Passive Optical Networks" Journal of Lightwave Technology, vol. 31, No. 6. Mar. 2013. pp. 982-987.

(Continued)

*Primary Examiner* — Ellen Kim
(74) *Attorney, Agent, or Firm* — Tutunjian & Bitetto, P.C.; Vazken Alexanian

(57) ABSTRACT

Methods for wavelength filtering and structures for accomplishing the same. Wavelength filtering includes forming grooves in a waveguide to define angled surfaces in a path of the waveguide; forming a reflective layer on the angled surfaces; depositing cladding material on top of the waveguide and on the angled surfaces; forming a filter layer on an active region of an opto-electronic device, which transmits a single wavelength and reflects other wavelengths used; depositing the opto-electrical device on the cladding layer such that the filter layer is aligned with a point of incidence of a light beam reflected from the reflective layer; and electrically bonding the opto-electronic device to vias in the waveguide structure.

14 Claims, 8 Drawing Sheets

(56) References Cited

OTHER PUBLICATIONS

Lemoff, B., et al. "Maui: Enabling Fiber-To-The-Processor With Parallel Multiwavelength Optical Interconnects" Journal of Lightwave Technology, vol. 22, No. 9. Nov. 2004. pp. 2043-2054.
Tokunari, M., et al. "High-Bandwidth Density Optical I/O for High-Speed Logic Chip on Waveguide-Integrated Organic Carrier" May 2011. 2011 Electronic Components and Technology Conference. pp. 819-822.
Yoon, K., et al. "2.5-GB/S Hybridly-Integrated Tunable External Cavity Laser Using a Superluminescent Diode and a Polymer Bragg Reflector" Optics Express, vol. 18, No. 6. Mar. 2010. pp. 5556-5561.
Young, I., et al. "Optical I/O Technology for Tera-Scale Computing" IEEE Journal of Solid-State Circuits, vol. 45, No. 1. Jan. 2010. pp. 235-248.

* cited by examiner

US 9,086,551 B2

DOUBLE MIRROR STRUCTURE FOR WAVELENGTH DIVISION MULTIPLEXING WITH POLYMER WAVEGUIDES

BACKGROUND

1. Technical Field

The present invention relates to fiber optics systems and, more particularly, to wavelength division multiplexing with polymer waveguides.

2. Description of the Related Art

Optical data transfer is increasingly used in high-performance computing, where short-range optical communication provides a fast and low power alternative to electrical communication. However, despite these developments, new multi-core processing architectures demand higher bandwidth and density. The number of channels needed to transfer information is increasing rapidly. In the most advanced systems, more than 60,000 individual fibers are used, so that practical physical limits are being rapidly reached.

Efforts have been made to use a single fiber to carry multiple data signals at different wavelengths. This increases the total bandwidth of a system without a corresponding increase in the number of physical channels, but existing wavelength division multiplexing solutions are difficult to implement on optical printed circuit board technology. In one notable example, a dielectric mirror is formed in a waveguide at a forty-five degree angle to the direction of transmission. The mirror is made to be selectively reflective, such that one wavelength is reflected out of the waveguide path while the other wavelengths are passed through.

However, it is difficult to form such a reflector on a polymer waveguide, it is difficult to form structures on a forty-five degree angle due to shadow effects, and the reflector itself must be relatively thick due to a large polarization dependency that results from the forty-five degree angle of incidence.

SUMMARY

A wavelength filtering structure includes a first reflective surface, positioned at an end of a first waveguide section, that reflects a beam comprising a plurality of wavelengths; a filter in the path of the reflected beam that allows a selected wavelength from the reflected beam to pass and that reflects all other wavelengths in a selected beam; and a second reflective surface, positioned adjacent to the first reflective surface and at an end of a second waveguide section, that reflects the selected beam into a core of the second waveguide section.

A wavelength division multiplexer/demultiplexer includes a plurality of filtering structures formed next to each other on a board, each transmitting a different wavelength from a beam comprising a plurality of wavelengths. Each filtering structure includes a first reflective surface, positioned at an end of a first waveguide section, that reflects the beam comprising a plurality of wavelengths, formed at an angle less than 45 degrees relative to a beam path and having a curve to compensate for beam divergence; a filter in the path of the reflected beam that allows the selected wavelength from the reflected beam to be transmitted and that reflects all other wavelengths in a selected beam; and a second reflective surface, positioned adjacent to the first reflective surface and at an end of a second waveguide section, that reflects the selected beam to the end of the second waveguide section, formed at an angle less than 45 degrees relative to the beam path.

A method for forming a wavelength filtering structure includes forming grooves in a waveguide to define angled surfaces in a path of the waveguide; forming a reflective layer on the angled surfaces; depositing cladding material on top of the waveguide and on the angled surfaces; forming a filter layer on an active region of an opto-electronic device, which transmits a single wavelength and reflects other wavelengths used; depositing the opto-electrical device on the cladding layer such that the filter layer is aligned with a point of incidence of a light beam reflected from the reflective layer; and electrically bonding the opto-electronic device to vias in the waveguide structure.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention provide wavelength division multiplexing (WDM) in a polymer waveguide structure having an array of cores with a high density. The present embodiments use a double mirror structure with a dielectric filter deposited on an opto-electronic device array or on the top cladding to form wavelength filters. Although it is specifically contemplated that polymer waveguides be used in the present embodiments, it should be recognized that the present principles may be readily extended to other types of waveguide. Polymer waveguides and micromirrors guide the light from laser arrays with a high density, for example a 125 um core pitch. The signals from a board can be sent directly to another board via polymer waveguides for short range integrated data transfer, or can be coupled to a fiber ribbon for longer range data transfer.

Figure 1:
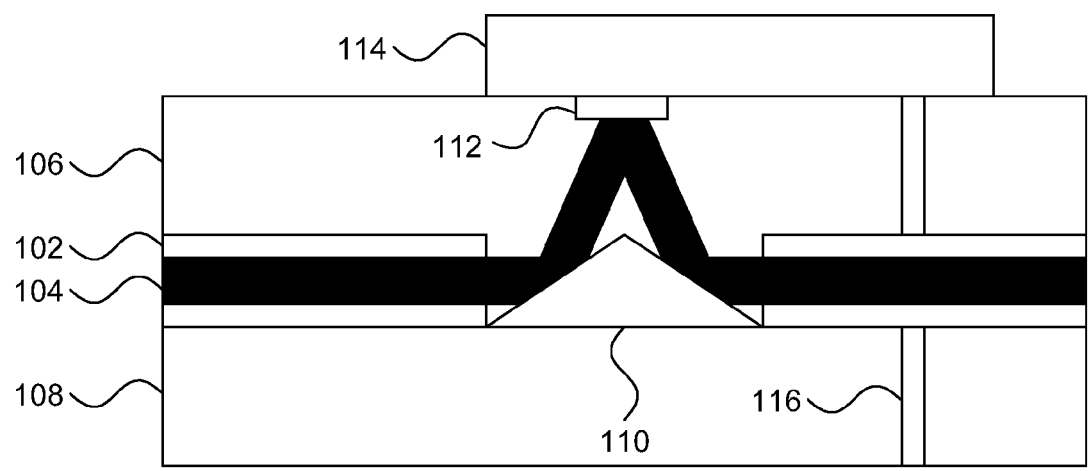
FIG. 1 is a cross-sectional view of a section of a wavelength demultiplexer structure in accordance with the present principles.

Referring now to the drawings in which like numerals represent the same or similar elements and initially to FIG. 1, a WDM mirror structure is shown. A waveguide core layer 102 is formed with an upper cladding 106 and a lower cladding 108. The waveguide carries a beam 104 that includes several different wavelengths. In the present examples the beam 104 is described with respect to four wavelengths, $\lambda_1$, $\lambda_2$, $\lambda_3$, and $\lambda 4$, but it is contemplated that any number of mutually non-interfering wavelengths may be used.

In a receiver configuration, the beam 104 is reflected by a two-sided mirror structure 110 at an angle of incidence larger than forty-five degrees. The mirror structure 110 may be formed with a surface of gold or some other appropriate reflective material that has little loss at the wavelengths of the beam 104. The beam 104 then exits the plane of the waveguide 102 through the upper cladding 106 to reach a dielectric filter 112. The dielectric filter is transparent to only one of the wavelengths, e.g., $\lambda_1$, which reaches a detector device 114. The remaining wavelengths are reflected from the dielectric filter 112, reflect off of mirror 110, and reenter the waveguide 102. It is anticipated that the detector 114 may send an electrical signal corresponding to the received light through electrical via 116, but it should be understood that additional processing may occur as well and other electrical contact configurations such as a planar line on top of the clad layer 106 are also possible.

It is to be understood that the present invention will be described in terms of a given illustrative architecture having a laminar substrate and waveguide-integrated organic carrier; however, other architectures, structures, substrate materials and process features and steps may be varied within the scope of the present invention.

It will also be understood that when an element such as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

A design for a polymer waveguide may be created in a graphical computer programming language, and stored in a computer storage medium (such as a disk, tape, physical hard drive, or virtual hard drive such as in a storage access network). If the designer does not fabricate waveguides or the photolithographic masks used to fabricate waveguides, the designer may transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the design in question that are to be formed on a polymer substrate. The photolithographic masks are utilized to define areas of the substrate (and/or the layers thereon) to be etched or otherwise processed.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 2:
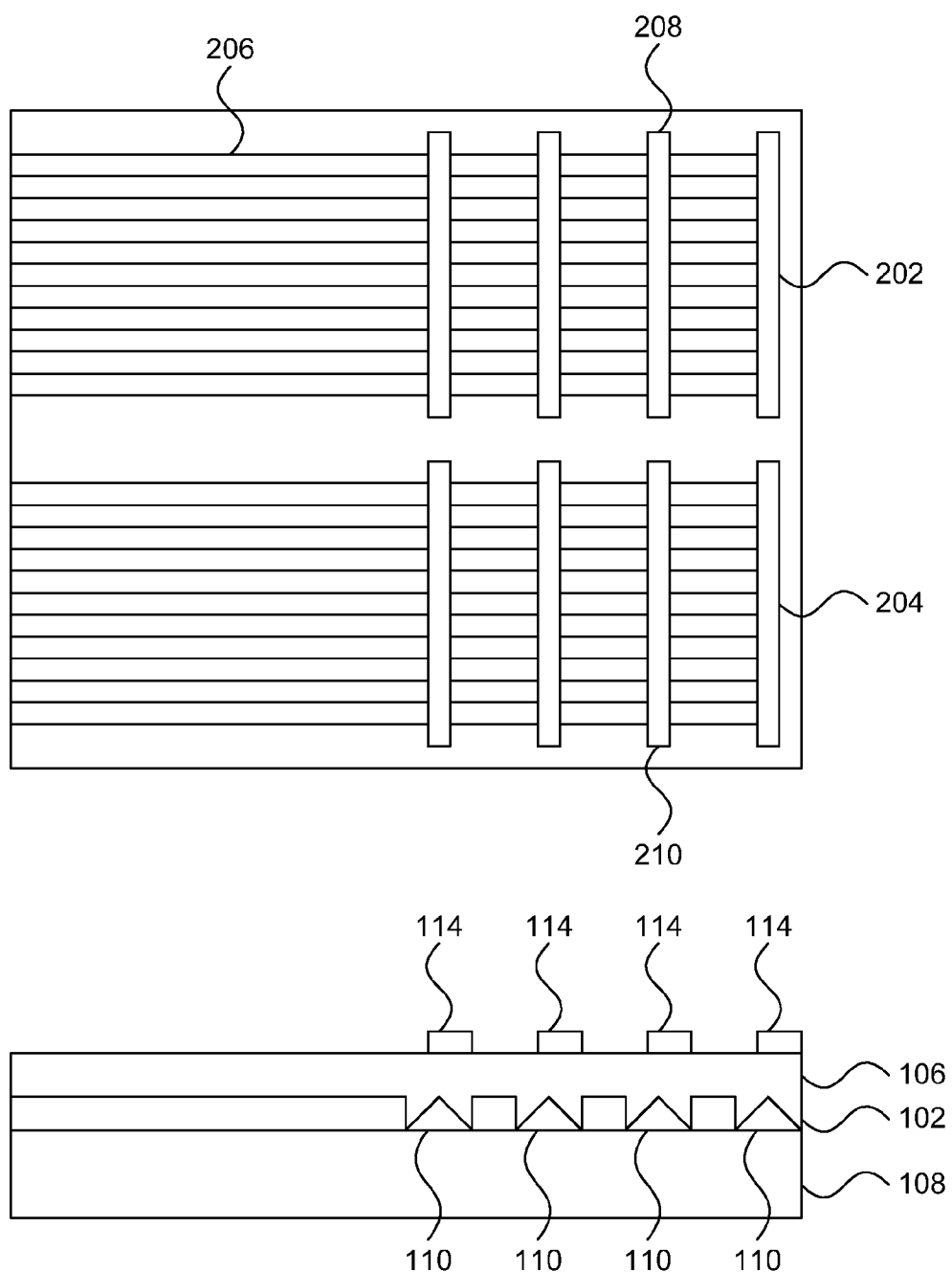
FIG. 2 is a top-down and side view of a wavelength division multiplexing transceiver in accordance with the present principles.

Referring now to FIG. 2, a WDM transceiver is shown. A WDM demultiplexer is made out of four photodetector arrays 202 that receive light from the waveguide array 206, each core initially carrying four different wavelengths. The wavelength-specific filters 208 each transmit only one of the wavelengths and reflect the others, such that the fourth and final filter 208 transmits the final remaining wavelength. After transmission through the filters, light from each core reaches the active regions of a detector. In a preferred embodiment, the detectors are semiconductor photodiode arrays electrically linked to a trans-impedance limiting amplifier integrated circuit.

A WDM multiplexer 204 has the reverse light path from the WDM demultiplexer, with the four wavelength-specific filters 210 on top of a second waveguide array 206. Each of the filters 210 transmits light at one of the four wavelengths and reflects light at the other wavelengths. It should be noted that the number of wavelengths could be smaller or greater than four for the multiplexer and the demultiplexer.

In one exemplary embodiment, the demultiplexer 202 may receive light signals at the wavelengths 850 nm, 980 nm, 1020 nm, and 1060 nm. At the first wavelength-specific filter 208, the 850 nm wavelength may be transmitted, leaving the 980 nm, 1020 nm, and 1060 nm light signals to be reflected back inside the waveguides 206. Similarly, the second wavelength-specific filter 208 transmits the 980 nm light signal and reflects the 1020 nm and 1060 nm light signals. The third filter 208 transmits 1020 nm, and the final light signal at 1060 nm is transmitted to the photodiode 204. Conversely, for the multiplexer, the wavelength-specific filters 210 combine the light signals at the four wavelengths emitted from the laser arrays 204, which emit light at 850, 980, 1020 and 1060 nm respectively.

A cross-sectional side view is also shown that illustrates each of the filters 208 as including a detector device 114 and a mirror structure 110. The actual filter 112 is very small relative to the size of the device 114 and the mirror structure 110 and is not shown here for the sake of simplicity.

Figure 3:
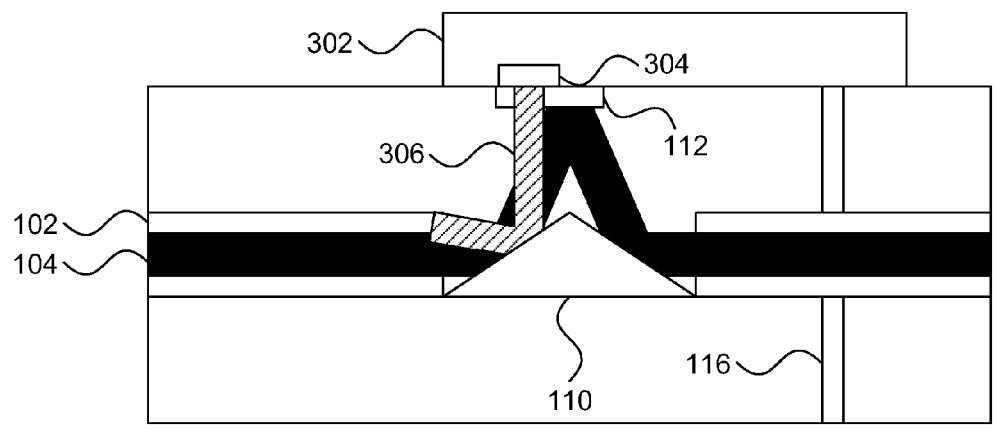
FIG. 3 is a cross-sectional view of a section of a wavelength multiplexer in accordance with the present principles.

Referring now to FIG. 3, a wavelength-specific transmitter is shown. An electrical signal reaches the emitter device 302 from an electrical via 116 or other electrical configuration so that the emitter 304 emits light at a specified wavelength. The emitter 304 is specifically contemplated as being a vertical cavity surface emitting laser (VCSEL) array, though it is contemplated that other emitters might also be employed. The filter 112 is transparent to the emission wavelength of the emitter 304 directly above it, but reflects light coming from the mirror 110 and emitted by the other emitters 304. The combined light signal re-enters the waveguide core 104. As VCSELs emit light perpendicular to their surface, a slight coupling loss may occur as the light beam enters the waveguide core after reflection from the mirror 110. However, this loss is typically small and the VCSEL active area has a diameter smaller than the beam, typically in the range of about 3μ to about 8 μm. As an alternative embodiment, an asymmetric lens may be fabricated on the emitter 304 to make the emitted light beam 306 parallel to the other beam 104.

One potential difficulty with the double-mirror structures described above can be found in the fact that the beams 104 will have a small divergence angle as they exit the waveguide 102, resulting in some coupling loss. The beams 104 may be propagated for a distance of, e.g., 200 μm before reentering the waveguide 102. The mirror structure 110 and the ends of the waveguides 102 may be formed to accommodate and correct for these losses.

Figure 4:
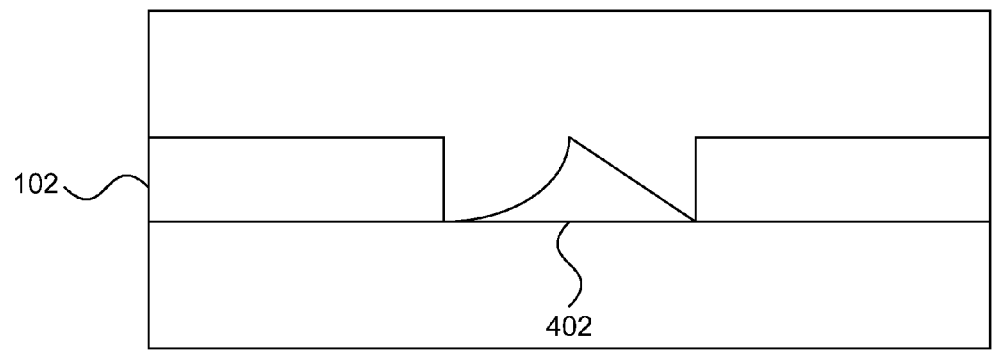
FIG. 4 is a cross-sectional view of a curved mirror structure in accordance with the present principles.

Referring now to FIG. 4 a modified double mirror structure is shown. In contrast to the mirror-structure 110 shown above, which has flat sides, the modified mirror structure 402 has at least one curved side. The curve may, for example, be along a single axis or may be a paraboloid shape. Only one face of the modified mirror structure 402 needs to be curved, and the curved face should preferably be the one on which light coming out of the waveguide is first reflected.

A single-axis curve, as shown, is easier to fabricate but can only correct for divergence in one direction, while a parabolic or elliptical mirror will be able to collimate light in both directions but will be more difficult to fabricate. To account for the second axis of divergence when using a single-axis curved mirror 402, the waveguides 102 may be tapered, both before and after the beam is reflected on the mirror 402.

Figure 5:
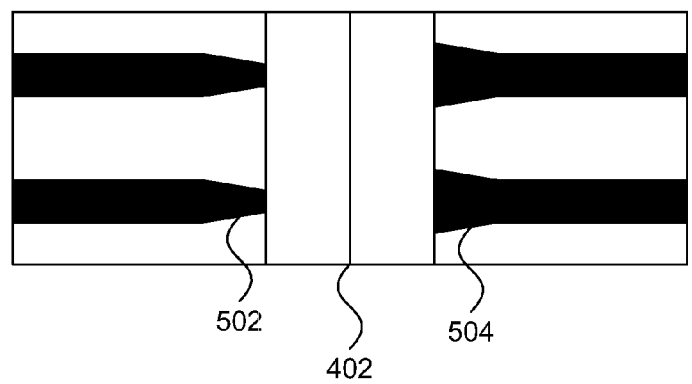
FIG. 5 is a top-down view of waveguides in accordance with the present principles.

Referring now to FIG. 5, tapered waveguides to compensate for planar beam divergence are shown. The core of the waveguide 502 from which light is coming becomes smaller closer to the curved mirror structure 402, decreasing the beam size before it is reflected. After the beam is reflected by the second surface of the mirror structure 402, it re-enters the waveguide 504. The core of the waveguide 504 is widened so that a higher portion of the diverging light beam can be guided into the core. The core size is gradually decreased to its initial standard value. The combination of smaller core size on one side of the waveguide and larger size on the other helps to minimize loss due to beam divergence in the plane of the waveguides.

Figure 6:
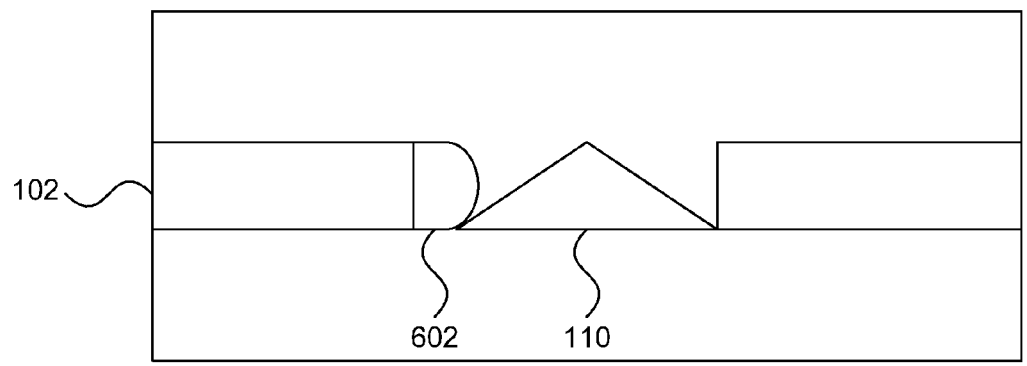
FIG. 6 is a cross-sectional view of a waveguide focusing element in accordance with the present principles.

Referring now to FIG. 6, an alternative embodiment is shown that uses a focusing element 602 that is separate from the mirror structure 110. In this embodiment a portion of the waveguide 102 near the mirror structure 110 is removed to make space for a lens array 602. This lens array 602 may be a single unit that is inserted across multiple waveguides 102 and can be made, for example, from glass or polymer.

Figure 7:
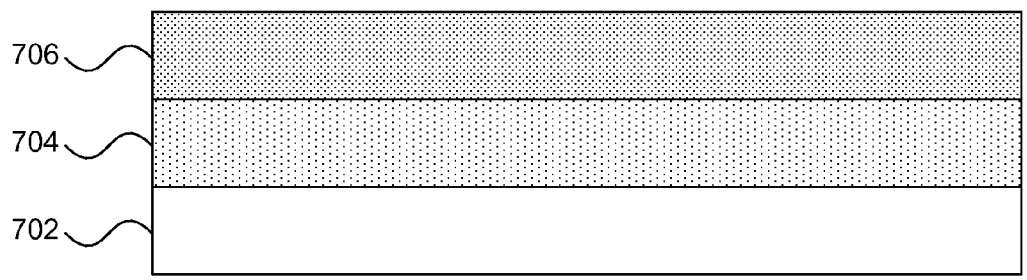
FIG. 7 is a cross-sectional view of a step in forming a wavelength filter structure in accordance with the present principles.

Referring now to FIG. 7, a step in creating a WDM mirror structure is shown. A lower cladding 704 and a polymer waveguide material 706 are formed on a substrate 702. The waveguide material 706 is deposited in a layer and a core pattern is formed by using a lithography technique or other optical method to slightly alter the refractive index of the material. The substrate may be, for example, an FR4-grade board formed from glass-reinforced epoxy laminate sheets, but it is contemplated that any appropriate material may be used instead.

Figure 8:
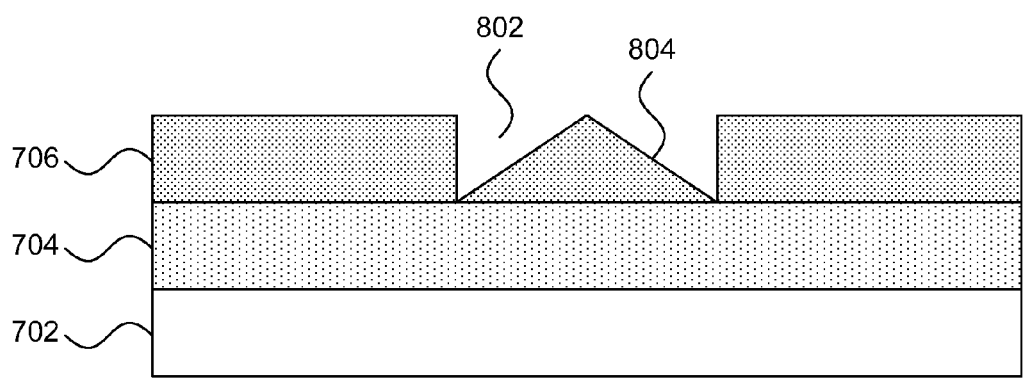
FIG. 8 is a cross-sectional view of a step in forming a wavelength filter structure in accordance with the present principles.

Referring now to FIG. 8, a step in creating a WDM mirror structure is shown. Two grooves 802 are formed in the waveguide material 706 for each wavelength expected in beam 104. The grooves 802 are formed such that a shallow-angled surface is formed, having an angle of less than forty-five degrees. A reflecting layer 804 is deposited on the surfaces of the remaining waveguide material 706 forming the bottom of the grooves 802. The reflector 804 may be formed from, e.g., gold or any other suitable material that will reflect all operation wavelengths. To form the reflector 804, a mask may be positioned over the waveguide material 706 to expose only the grooves 802 and the reflective material may be deposited using one of, e.g., evaporation, sputtering, atomic layer deposition, chemical vapor deposition, etc.

Figure 9:
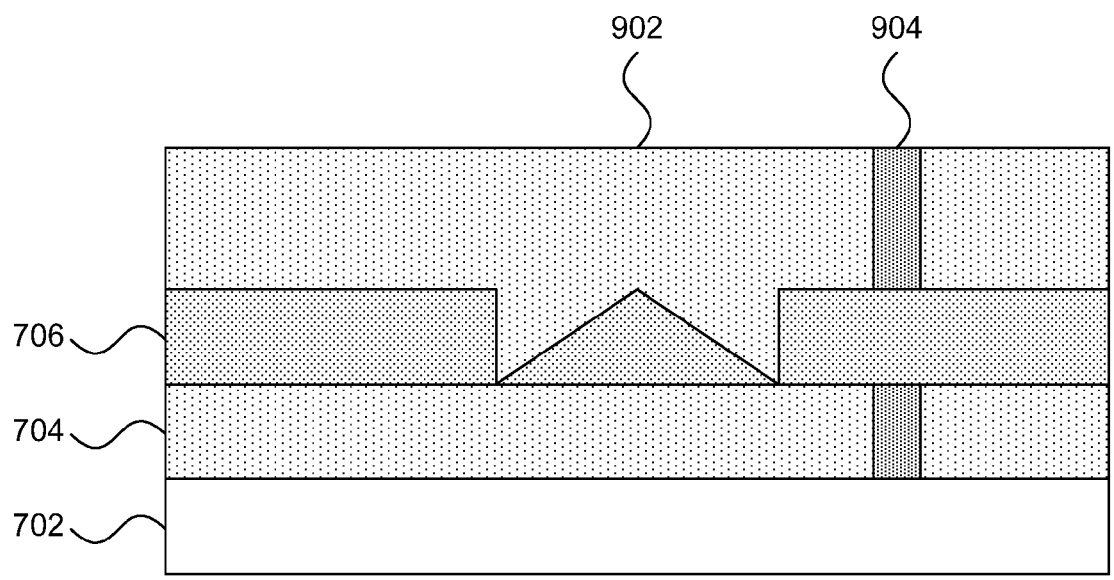
FIG. 9 is a cross-sectional view of a step in forming a wavelength filter structure in accordance with the present principles.

Referring now to FIG. 9, an additional cladding layer 902 is deposited on top of the core layers and in the grooves. Vias 904 are created that go through the cladding 704/902. The vias 904 are formed by drilling or etching holes in the cladding 704/902 using a method such as, e.g., laser drilling. A conductor is then deposited in the holes, creating a conductive link between the top of the cladding and the board underneath the bottom cladding layer.

Figure 10:
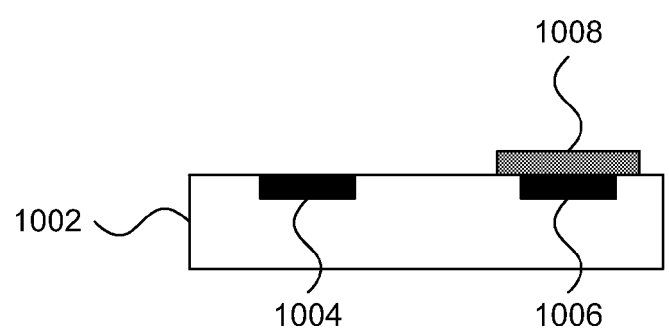
FIG. 10 is a cross-sectional view of a step in forming a wavelength filter structure in accordance with the present principles.

Referring now to FIG. 10, an opto-electronic device 1002 is formed separately. As described above, the device 1002 may be a detector or a laser array (e.g., a semiconductor photodiode array and a VCSEL array) for a specific wavelength. The device 1002 has metal pads 1004 and an active region 1006 to emit or absorb light. A filter 1008 is deposited on the active region 1006 and is transparent to one of the wavelengths expected in beam 104. The filter 1008 therefore allows the selected wavelength to be transmitted to or from the device active region 1006 and reflects the other wavelengths. The filter 1008 may be, for example, a distributed Bragg reflector or some other photonic crystal structure formed using, e.g., a quarter wave stack of two dielectric materials such as $SiO_2/TiO_2$ deposited by evaporation. Semiconductor materials or other types of filters, such as colored glass, can also be used.

Figure 11:
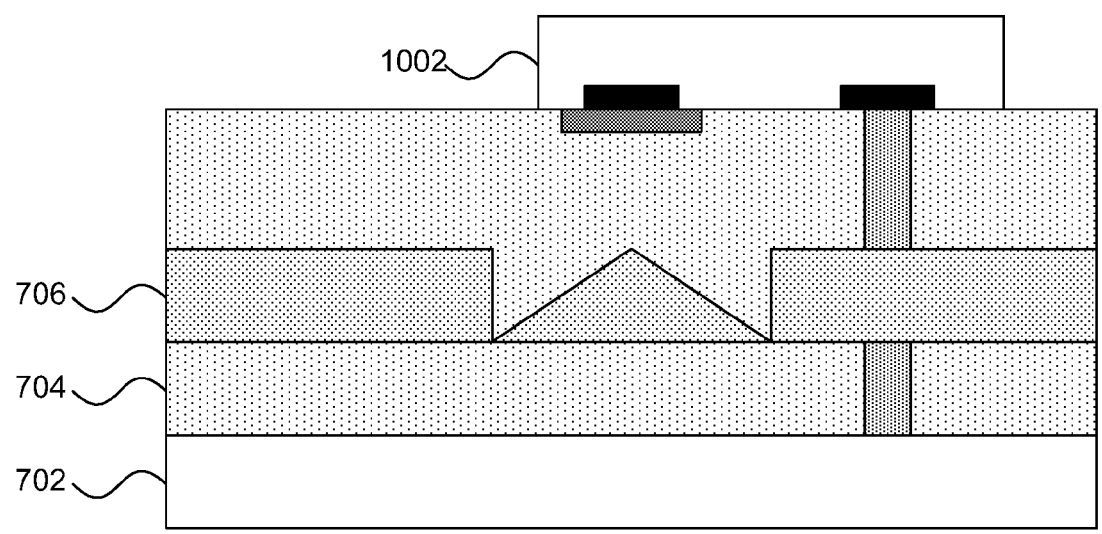
FIG. 11 is a cross-sectional view of a step in forming a wavelength filter structure in accordance with the present principles.

Referring now to FIG. 11, the opto-electronic device 1002 is flip-bonded to the upper cladding 902 and electrical contact using, for example, C4 bonding. The electrical device 1002 is positioned such that the metal pads 1004 align with the via 904 and the filter 1008 is over the reflector 804. The specific alignment of the filter 1008 and the receiver/transmitter 1006 with respect to the reflector 804 will vary depending on whether the opto-electronic device 1002 is a detector, in which case the receiver 1006 will be aligned with the reflected beam, or as a transmitter, in which case the transmitter may be slightly off-center to minimize the coupling loss with a waveguide core 706. It should be noted that the present figures are not drawn to scale—the thickness of the filter 1008 may be about 2-5 μm thick, which is negligible compared to the process variation of the cladding surface.

Figure 12:
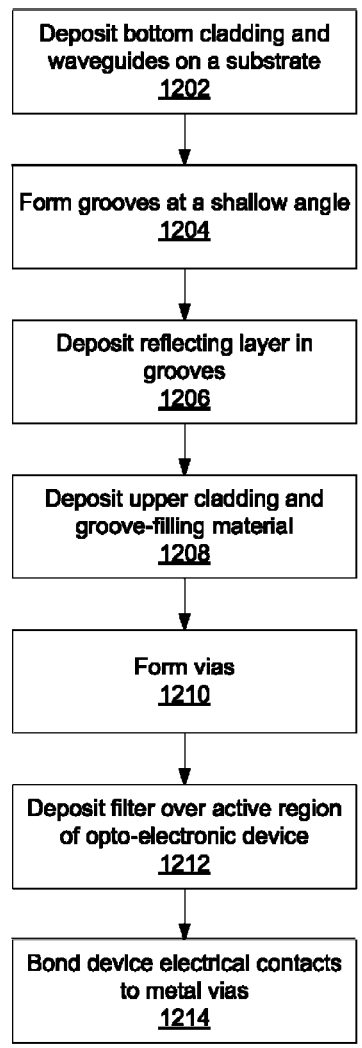
FIG. 12 is a block/flow diagram of a method of forming a wavelength filter structure in accordance with the present principles.

Referring now to FIG. 12, a block/flow diagram of the fabrication of a double mirror WDM structure is shown. In block 1202, a lower cladding 704 is deposited on a board 702. The core layer 706 is then deposited, and the cores are formed using lithography or other technique. In block 1204, grooves 802 at a shallow angle are formed in the waveguide material 706 to produce a double-sided structure. In block 1206, a layer 804 is deposited in the grooves by, e.g., evaporation or other technique that is reflective at all the operation wavelengths. In block 1208, an upper cladding 902 is deposited on top of the reflector 708 and core layer 706. In block 1210, vias 904 are formed by drilling or etching a hole in the waveguide layers 902/706/704 and filling the hole with a conductive material.

In block 1212, a filter 1108 is deposited on the active region of a laser or detector array 1006. The filter 1008 is transparent to one specific wavelength out of the operating wavelengths, such that any other wavelength is reflected. In block 1214, the emitter/receiver 1002 is flip-chip bonded to the upper cladding 902 such that the filter 1008 is positioned over the reflector 804 and the device 1002 is electrically connected to the vias 904.

Figure 13:
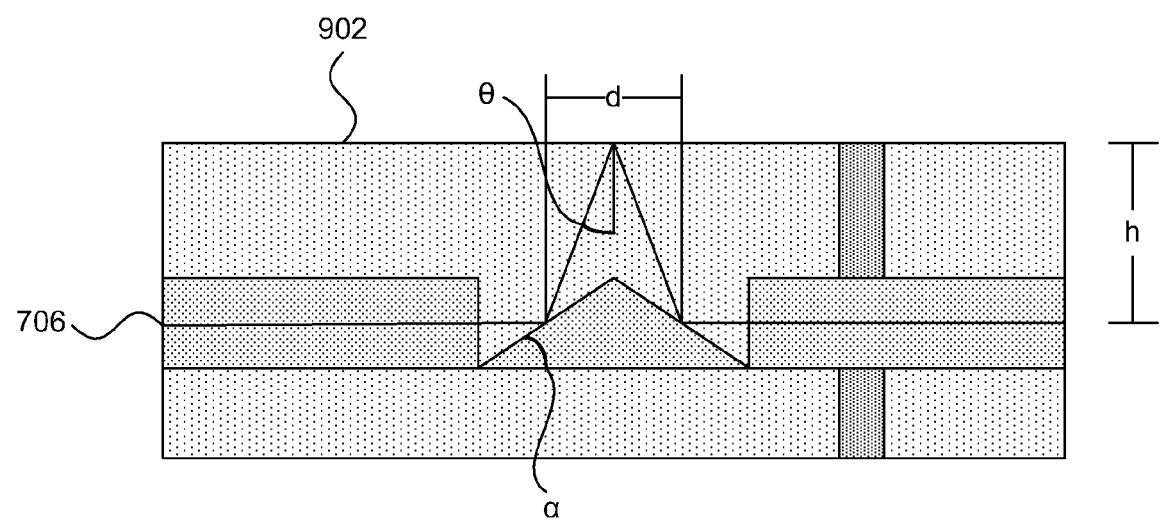
FIG. 13 is a cross-sectional view of geometric relationships in a wavelength filter structure in accordance with the present principles.

Referring now to FIG. 13, the upper cladding layer 902 is shown with dimensional considerations. The thickness of the upper cladding layer 902, as well as the unguided light path length depends on the dimensions of the reflector 804. In particular, the height h of the cladding layer 902 can be expressed as $h=d/2 \tan(\theta)$, where d is the horizontal distance between the beam incident on the reflector 804 and the beam reflected a second time from the reflector 804, measured from the middle of the respective beams and $\theta$ is the angle of incidence of the reflected beam at the top of the cladding layer 902. $\theta$ is determined by the angle of the reflector 804 as $\theta=90°-2\alpha$, where $\alpha$ is the angle between the surface of the reflector 804 and the plane of the waveguide core. A minimum value for d, and hence for h, may be determined as $d_{min}=w/\tan(\alpha)$, where w is the beam width and is related to the size of the waveguide core size.

Having described preferred embodiments of a double-mirror structure for WDM with polymer waveguides and methods of forming the same (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A wavelength filtering structure, comprising:
a first reflective surface having a curve along a single axis to compensate for beam divergence in a single dimension, positioned at an end of a first waveguide section that is tapered relative to a carrying width of the first waveguide section, that reflects a beam comprising a plurality of wavelengths;
a filter in the path of the reflected beam that allows a selected wavelength from the reflected beam to pass and that reflects all other wavelengths in a selected beam; and
a second reflective surface, positioned adjacent to the first reflective surface and at an end of a second waveguide section that is widened relative to a carrying width of the second waveguide section, that reflects the selected beam into a core of the second waveguide section.

2. The wavelength filtering structure of claim 1, wherein the first and second reflective surfaces are formed at an angle relative to the beam path.

3. The wavelength filtering structure of claim 2, wherein the first and second reflective surfaces are formed at an angle less than 45 degrees relative to the beam path.

4. The wavelength filtering structure of claim 1, further comprising a photodetector configured to receive the selected wavelength that passes through the filter.

5. The wavelength filtering structure of claim 1, further comprising an emitter configured to emit the selected wavelength through the filter.

6. The wavelength filtering structure of claim 5, wherein the emitter comprises a lens configured to orient the emitted light in a direction parallel to the existing beam.

7. The wavelength filtering structure of claim 5, wherein the emitter is set at a non-zero lateral distance from a point of incidence on the filter where the reflected beam hits.

8. The wavelength filtering structure of claim 7, wherein the emitted wavelength reflects from the second mirror to enter the second waveguide section.

9. The wavelength filtering structure of claim 1, further comprising a focusing element at an end of the first waveguide section configured to compensate for beam divergence.

10. A wavelength division multiplexer/demultiplexer, comprising:
a plurality of filtering structures formed next to each other on a board, each transmitting a different wavelength from a beam comprising a plurality of wavelengths, each filtering structure comprising:
a first reflective surface, positioned at an end of a first waveguide section that is tapered relative to a carrying width of the first waveguide section, that reflects the beam comprising a plurality of wavelengths, formed at an angle less than 45 degrees relative to a beam path and having a curve along a single axis to compensate for beam divergence;
a filter in the path of the reflected beam that allows the selected wavelength from the reflected beam to be transmitted and that reflects all other wavelengths in a selected beam; and
a second reflective surface, positioned adjacent to the first reflective surface and at an end of a second waveguide section that is widened relative to a carrying width of the second waveguide section, that reflects the selected beam to the end of the second waveguide section, formed at an angle less than 45 degrees relative to the beam path.

11. A method for forming a wavelength filtering structure, comprising:
forming a waveguide having a first section that tapers in a first dimension and a second section that is widened in the first dimension relative to a carrying width of the respective waveguide sections;
forming grooves in the waveguide to define angled surfaces in a path of the waveguide, wherein one of said grooves is formed with a curve along a single axis of one of the angled surfaces to compensate for beam divergence in a second dimension;
forming a reflective layer on the angled surfaces;
depositing cladding material on top of the waveguide and on the angled surfaces;
forming a filter layer on an active region of an opto-electronic device, which transmits a single wavelength and reflects other wavelengths used;
depositing the opto-electrical device on the cladding layer such that the filter layer is aligned with a point of incidence of a light beam reflected from the reflective layer; and
electrically bonding the opto-electronic device to vias in the waveguide structure.

12. The method of claim 11, wherein forming grooves comprises forming the angled surfaces at an angle less than 45 degrees relative to a waveguide axis.

13. The method of claim 11, wherein the opto-electronic device comprises a photodetector configured to receive the selected wavelength that passes through the filter and wherein said step of bonding comprises bonding a surface of the electrical device having said photodetector to the cladding layer such that the photodetector is aligned with a point of incidence of a beam.

14. The method of claim 11, wherein the opto-electronic device comprises an emitter configured to emit the selected wavelength through the filter and wherein said step of bonding comprises bonding a surface of the electrical device having said emitter to the cladding layer such that the emitter is set to a non-zero lateral distance from a point of incidence of a beam.

* * * * *